United States Patent [19]

Drury

[11] Patent Number: 4,476,651
[45] Date of Patent: Oct. 16, 1984

[54] APPARATUS AND METHOD FOR TRANSPORTING GROWING PLANTS

[76] Inventor: Geoffrey Drury, P.O. Box 127, Granite Ave., Canaan, Conn. 06018

[21] Appl. No.: 461,513

[22] Filed: Jan. 27, 1983

[51] Int. Cl.³ .............................................. A01G 15/00
[52] U.S. Cl. .............................................. 47/65; 47/17
[58] Field of Search ................ 47/65, 62, 59, 17, 1.7

[56] References Cited

U.S. PATENT DOCUMENTS

| | | | |
|---|---|---|---|
| 2,684,640 | 7/1954 | Auger | 104/48 |
| 3,664,061 | 5/1972 | Oepen | 47/1.2 |
| 3,913,758 | 10/1975 | Faircloth et al. | 47/17 |
| 4,028,847 | 6/1977 | Davis et al. | 47/65 |
| 4,042,118 | 9/1977 | Schmidt | 214/1 BB |
| 4,163,342 | 8/1979 | Fogg et al. | 47/65 |
| 4,166,341 | 9/1979 | Vestergaard | 47/59 |
| 4,216,615 | 9/1980 | Soderberg et al. | 47/17 |
| 4,216,618 | 9/1980 | Haub et al. | 47/65 |
| 4,255,897 | 3/1981 | Ruthner | 47/65 |
| 4,317,308 | 3/1982 | Derrick et al. | 47/1.1 |

FOREIGN PATENT DOCUMENTS 2077082  12/1981  United Kingdom .................... 47/65

OTHER PUBLICATIONS

RO-FLO (Moveable) Bench and Rolling Pallet System, A. Reilly, Ohio Florists' Association Bulletin, Feb., 1982.
RO-FLO Brochure: Increase Your Profits with the New Ro-Flo Benching System (undated).

Primary Examiner—Robert A. Hafer
Assistant Examiner—Bradley M. Lewis
Attorney, Agent, or Firm—Kenyon & Kenyon

[57] ABSTRACT

Plants are supported, positioned, and transported in a hydroponic growing system by notched spacer bars riding on wheeled rails and interlocking with external ribs on elongated troughs in which the plants are grown. The apparatus permits easy and efficient movement of large arrays of plants by one worker, while maintaining the troughs in precise parallel relation to one another. The apparatus also provides automatic locating of the troughs with individual liquid nutrient feed points and alignment with a spent nutrient collecting system. Plant spacing in troughs transferred from one growing stage to the next is increased by alternating filled troughs with empty troughs on the spacer bars and transferring alternate plants from a filled trough to an adjacent empty trough.

7 Claims, 6 Drawing Figures

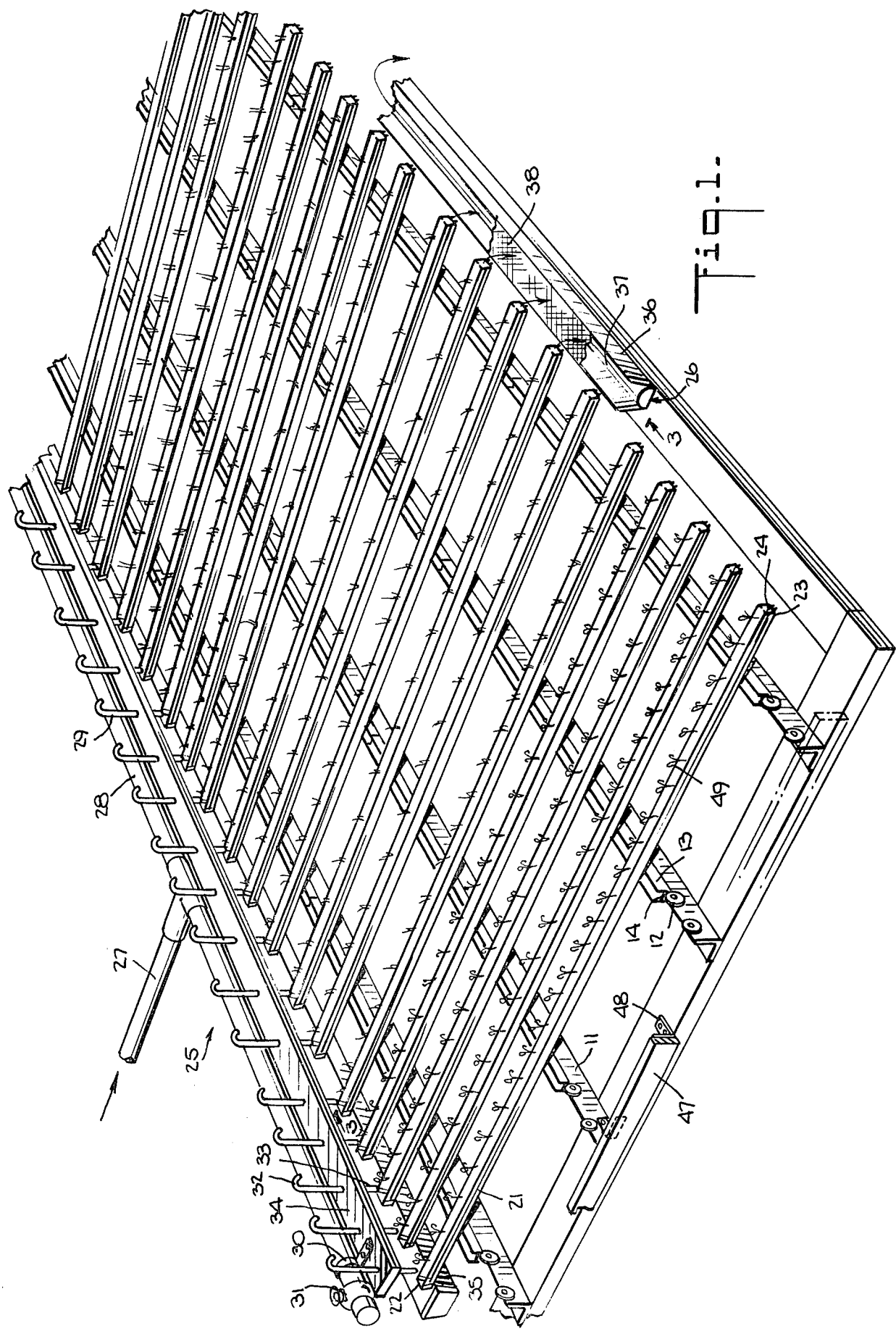

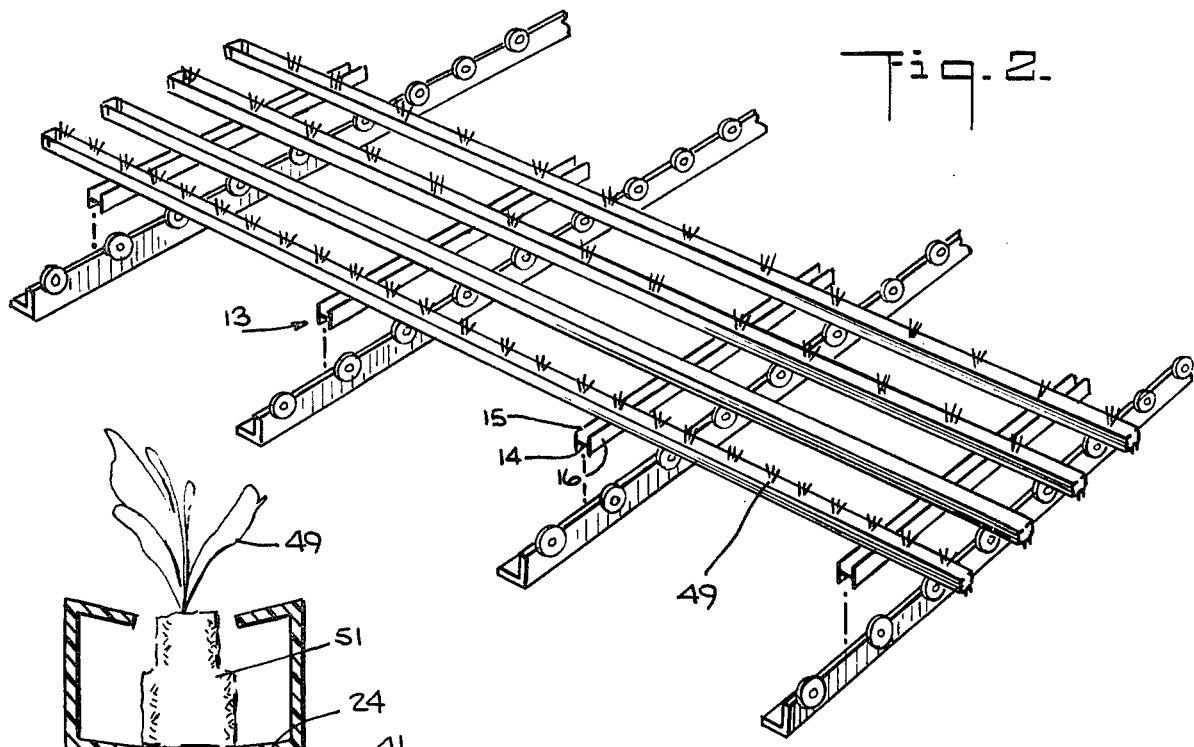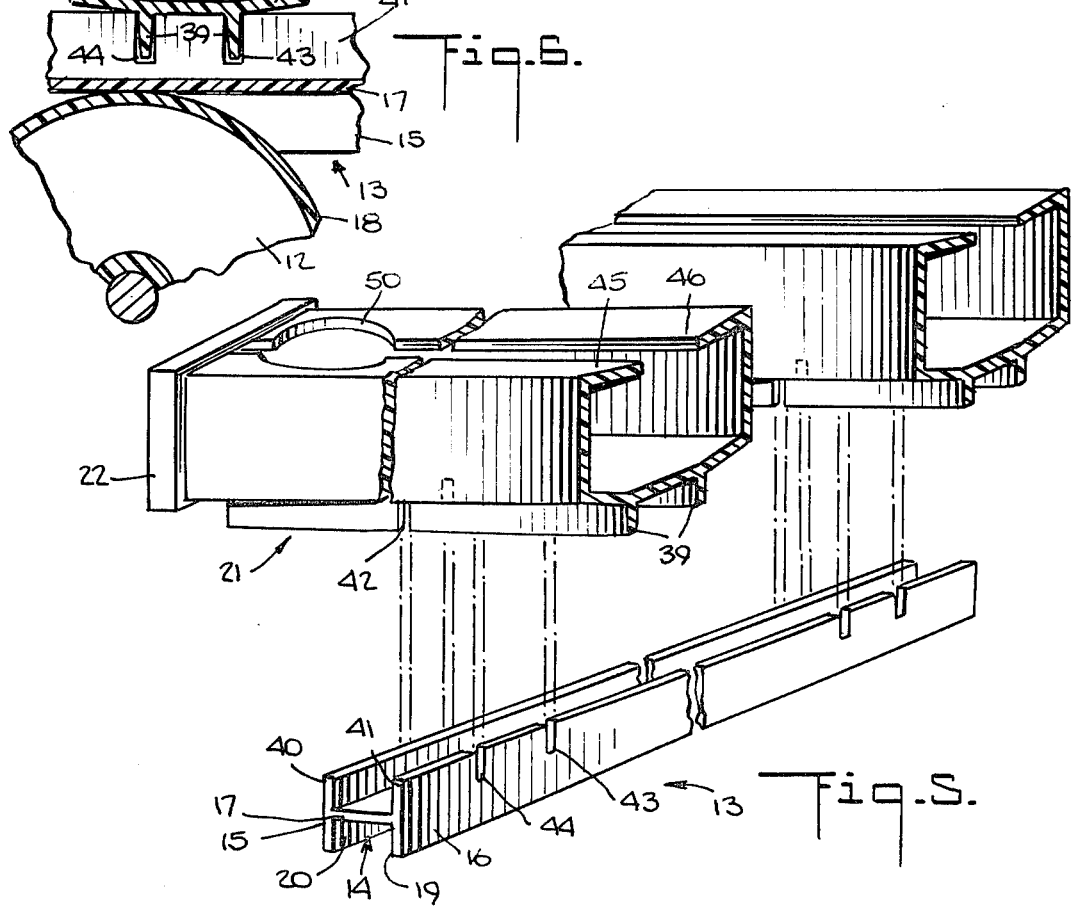

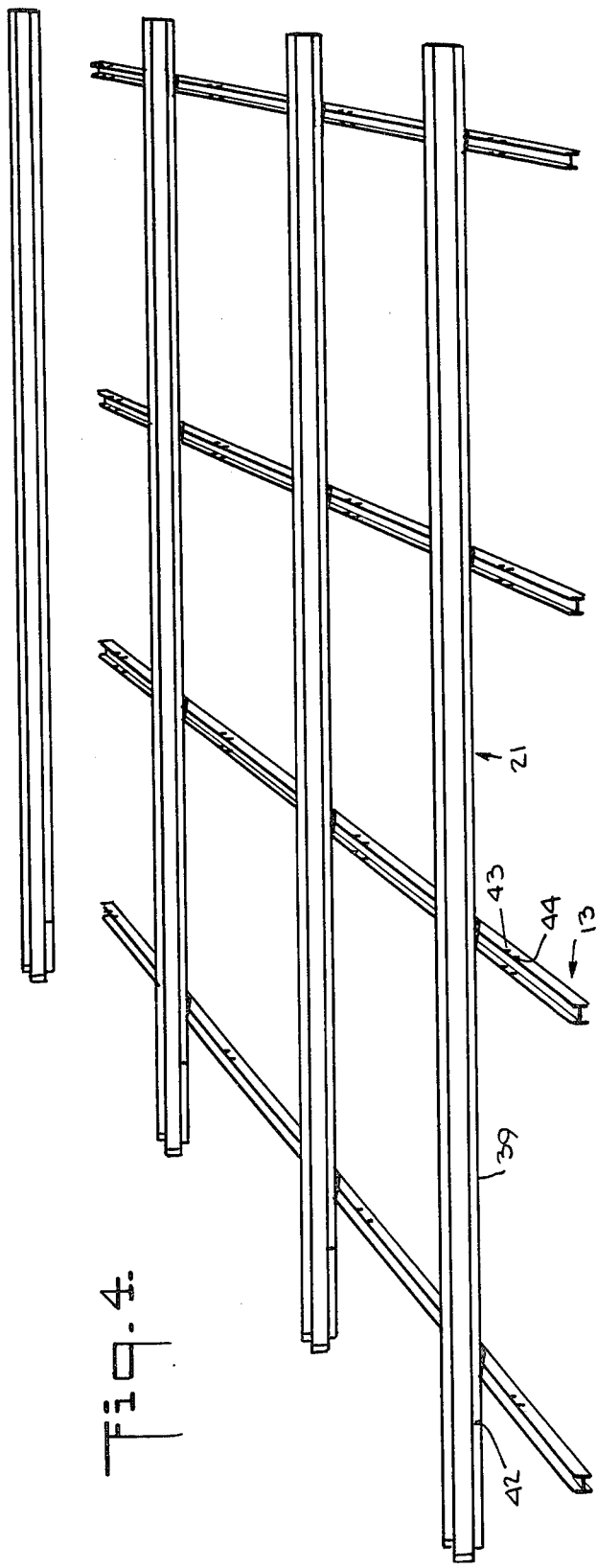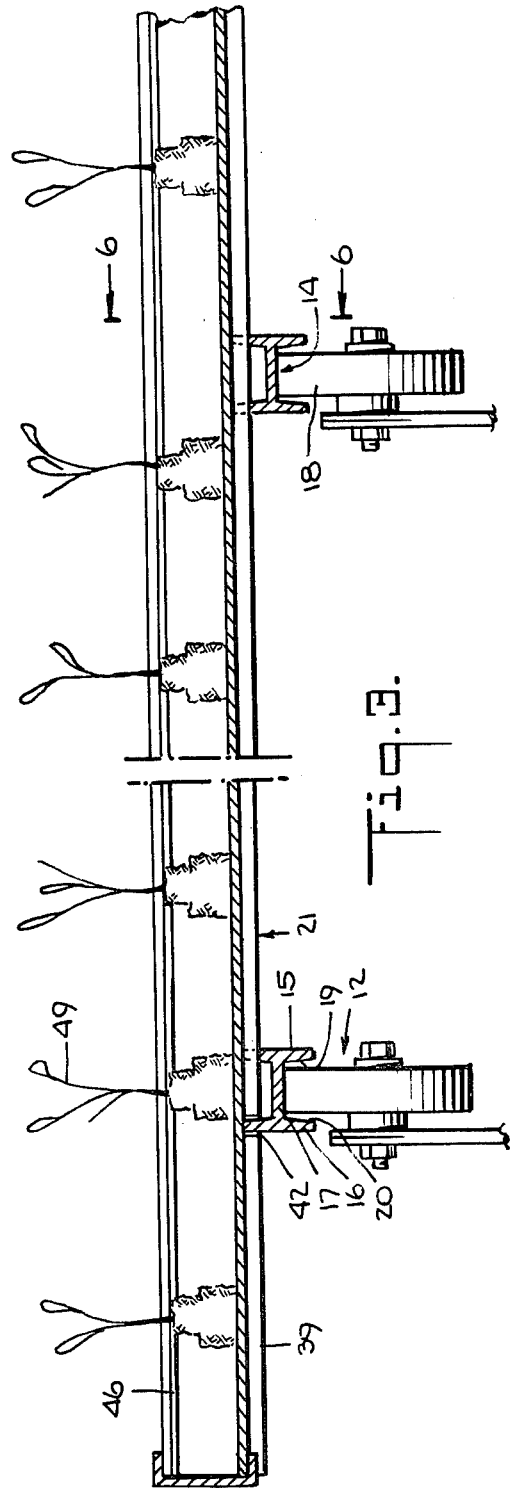

APPARATUS AND METHOD FOR TRANSPORTING GROWING PLANTS

BACKGROUND OF THE INVENTION

The present invention relates to apparatus for supporting, positioning and transporting hydroponic growing troughs and to a method for transferring growing plants.

For a variety of reasons, commercial scale cultivation of plants such as lettuce under controlled hydroponic conditions is on the increase. Rising transportation costs for field-grown produce, together with significant improvements in yields and quality possible in controlled environment growing systems, provide economic justification for the expense of controlling the nutrient supply and growing environment. Since the costs of heating, lighting and other aspects of environmental control is in large measure a function of the area being controlled, elaborate handling systems have been developed for progressively transporting the plants toward a harvesting station as they grow, so as to minimize the total growing space required. Typically these handling systems are designed to operate automatically or semi-automatically. Examples of such relatively complex handling apparatus for hydroponic systems are shown in U.S. Pat. No. 4,216,618 of Haub et al. and No. 4,028,847 of Davis et al.

Investment in sophisticated automated control equipment for maintaining both the environment and the liquid nutrient supply within close tolerances usually will result in lower net cost for marketable plants, because of the important effect such controls have on growth rate, yield, and quality. The same is not necessarily true for investment in complex automated apparatus for transporting the growing plants through a growing chamber or greenhouse. While the ability to move large arrays of plants easily and quickly is important, the use of complicated machinery for this purpose has a number of disadvantages. Obviously, such equipment is expensive. Plant handling and transport equipment is necessarily exposed to the warm, relatively humid growing environment, which is not favorable for electrical equipment or machinery. The growing plants typically require movement only at infrequent intervals, so that the usage factor for the transport mechanisms is low. In addition, providing complex mechanized plant transport systems can increase rather than decrease labor costs, since skilled maintenance and repair personnel are paid more than plant handlers and harvesters.

SUMMARY OF THE INVENTION

A general object of the present invention is to provide apparatus for supporting, positioning and transporting plants in a hydroponic growing system, such apparatus permitting easy and efficient movement of large arrays of plants while maintaining the plants in precise spatial relationship to one another.

More particularly, it is an object of the invention to provide apparatus for supporting a plurality of elongated troughs each containing a single row of plants and moving such troughs over a period of time in spaced parallel arrays through the length of a growth room or greenhouse.

It is a further object of the invention to provide apparatus that is sufficiently low in weight and frictional resistance to permit the movement of large arrays of such troughs by individual workers without the need for mechanical assistance, thus minimizing the labor required for such movement and the number of points at which intertwined foliage of adjacent troughs of growing plants must be separated.

Another object of the invention is to provide apparatus for maintaining all troughs in an array in a precise spaced parallel relation to each other regardless of any movement of the array, thus eliminating variations in the distance between the plants in one trough and their neighbors in an adjoining trough that would otherwise result in uneven growth and loss of uniformity in the mature plants.

Another object is to provide apparatus for delivering a continuous flow of liquid nutrient to each trough in an array and for collecting surplus nutrient therefrom, without the use of interconnecting plumbing that would interfere with movement of such troughs, and so arranged that no interruption of the flow is required when the troughs are moved.

Another object of the invention is to provide apparatus for automatic longitudinal alignment of the inlet and discharge points of every trough in an array with feed and collection points of the nutrient delivery system, as well as for precise lateral matching of the spacing of such inlet points with the spacing of such feed points. Thus, positioning of any one inlet point in the array directly beneath a feed point automatically indexes every other inlet point in the array under a corresponding feed point. Such indexing insures that every trough receives a proper supply of nutrient without the need for individual adjustment of trough positions.

Another object of the invention is to provide apparatus effective for such purposes that has low initial cost and a minimum number of different parts, requires essentially no maintenance other than cleaning of recycled parts, and can be operated by the same unskilled personnel employed to harvest the mature plants.

It is another object of the invention to provide a method for transferring plants from a nurseling stage to a maturing stage that permits close spacing of the plants in the nurseling stage yet minimizes the handling of individual plants to obtain the greater spacing needed in the maturing stage.

These and other objects are achieved by apparatus for supporting, positioning and transporting plants in a hydroponic growing system, the apparatus including a plurality of elongated troughs, each trough having an inlet end, an opposite outlet end, a flat or slightly concave bottom portion, and at least one longitudinally extending external rib depending from said bottom portion; means for supporting said troughs in spaced parallel relation so that the inlet end of each trough is at a first level and the outlet end is at a second level lower than the first level; means for delivering a flow of liquid nutrient to the inlet end of each trough; and means for collecting a flow of liquid nutrient from the outlet end of each trough, wherein the improvement comprises said means for supporting, positioning and transporting said troughs in spaced parallel relation including:

at least two spaced apart rolls extending under the troughs transversely to the longitudinal axes thereof;

a multiplicity of wheels rotatably mounted on each rail, the axes of rotation of the wheels perpendicularly intersecting at spaced intervals a longitudinal axis of the rail such that part of the rim of each wheel extends above the top of the rail; and at least one elongated spacer bar on each rail, each spacer bar having a longitudinal bottom groove engaged by the rims of a plurality of the wheels, such that the bar makes rolling contact with the wheels and is guided thereby along the rail, and at least one upright rib extending longitudinally along the top of the bar, said rib having at least one but preferably two or more spaced notches in the upper edge thereof for transversely receiving the bottom ribs of respective troughs, thereby maintaining the troughs in spaced relation on the spacer bars.

The invention also includes a method for transferring plants closely spaced in troughs of a nurseling stage of a hydroponic growing system to a more widely spaced maturing stage of the system, the method comprising:

arranging troughs containing closely spaced plants from the nurseling stage in spaced parallel relation alternately with empty troughs, the spacing between adjacent troughs being greater than the spacing between the plants in the plant-filled troughs, and transferring alternate plants from each plant-filled trough to the adjacent empty trough, thereby providing a staggered pattern of plants spaced in each trough at twice the initial spacing.

The above and other objects and features of the invention will be apparent from the following description of the preferred embodiment in conjunction with the accompanying drawings.

BRIEF DESCRIPTION OF THE DRAWINGS

FIG. 1 is a perspective view of the plant support, positioning and transport apparatus of the invention.

FIG. 2 is a partly exploded perspective view of part of the apparatus of FIG. 1.

FIG. 3 is a partial elevation view, in section, taken along line 3—3 of FIG. 1.

FIG. 4 is a partly exploded perspective view showing the manner of assembling troughs on the spacer bars of the invention.

FIG. 5 is a partial exploded detail perspective view of the manner of interlocking engagement of troughs on a spacer bar.

FIG. 6 is a partial detail elevation in section, taken along line 6—6 of FIG. 3.

DETAILED DESCRIPTION OF THE PREFERRED EMBODIMENT

As shown in FIGS. 1 and 3, the plant support, positioning and transport apparatus of the invention includes a set of spaced parallel tracks or rails 11 supported by any suitable structure (not shown) at a convenient working height. The rails extend the length of a predetermined growing area, which may be 30 meters or more. The rails are preferably made from metal angle, either corrosion resistant or having a corrosion resistant coating. Each rail is fitted with a number of small wheels, also preferably of a corrosion resistant material such as molded plastic, bolted to the vertical webs. The wheels rotate about axes that are perpendicular to and are spaced along a longitudinal axis of the rail which is located at a distance less than the wheel radius below the top edge of the rail. Thus, a portion of the rim of each wheel extends above the rail.

At least one spacer bar 13 is set on the wheels 12 of each rail. Spacer bars 13 preferably are H-shaped extrusions of polyvinyl chloride (PVC) or any other suitable material having similar desirable properties of corrosion resistance, light weight, strength, dimensional stability, low cost, and ease of fabrication. Each spacer bar 13 has a bottom groove 14 formed between portions of vertical flanges 15 and 16 that depend below a horizontal web 17. The flat undersurface of web 17 is at least as wide as the rim 18 of each wheel 12, and the respective inner surfaces 19 and 20 of flanges 15 and 16 preferably slant outwardly to the opening of groove 14 so that the flanges fit loosely on either side of the wheels 12. This allows each spacer bar to roll freely on the wheels from one end of the rail to the other, without binding, even if there is some dimensional variation between the wheels and misalignment of or nonlinearities in the rails.

The spacer bars 13, in turn, carry elongated troughs 21 extending tranversely to the direction of the rails in spaced parallel relation. These troughs are commercially available PVC extrusions known as gullies and will be referred to as such in the remainder of the discussion. Each gully 21 has an inlet end 22, an opposite outlet end 23, and a slightly concave bottom portion 24. There are enough rails 11 so that the gullies do not sag between adjacent rails, and the rails are arranged to maintain the bottoms of the gullies straight, and with their outlet ends lower than their inlet ends.

Means 25 for delivering a flow of fresh nutrient to the gullies extends adjacent to the inlet ends, and means 26 for collecting surplus nutrient from the gullies extends adjacent to the outlet ends. The nutrient delivery means 25 includes a supply pipe 27 connected to a source of fresh nutrient (not shown). Supply pipe 27 tees into a header pipe 28 that is mounted on a supporting shelf 29 by brackets 30. Header 28 is closed at each end by caps or preferably clean-out valves 31.

Flexible feed tubes 32 are connected at spaced intervals along the length of the header, the intervals being equal to the spacing of the gullies established by the spacer bars as described below. Preferably, the feed tubes are connected at the top of the header to avoid being clogged by sediment or undissolved particles in the nutrient supply. Each tube 32 has a free open end 33 inserted down through an adjacent hole 34 in the shelf to direct a stream of liquid nutrient into the inlet end of a corresponding gully below, without the need for any interconnecting plumbing.

A gutter 35 extending under the open ends of the feed tubes below the gullies catches the feed streams when the gullies are being moved, or are otherwise not aligned under the feed tubes, and returns the nutrient to the source reservoir. The gutter 35 allows a continuous flow of nutrient solution to be maintained at all times, thereby simplifying operation and control. A second gutter 36 extends below the outlet ends 23 of the gullies to catch surplus nutrient fluid and return it to the reservoir for treatment and recirculation. To prevent splashing, both gutters may have a shield member with a convexly curved upper surface, such as a half section of plastic pipe 37, lying on the bottom. Alternatively, or in addition, gutter 36 and/or gutter 35 may have a cover 38 of fine mesh which serves both to prevent splashing and to screen out debris from the collected nutrient liquid.

The prevention of splashing and other leakage of nutrient is important from a cleanliness standpoint because a coating of algae will quickly form on the floor and on any surfaces of the apparatus that are wetted with nutrient solution. For this reason, as well as to make sure that every gully receives a proper supply of nutrient, it is important to position the gullies accurately on the rails. The invention provides a simple yet effective arrangement for exactly spacing the gullies and for accurately aligning their ends, without the need for individually checking and adjusting gully positions.

With reference to FIGS. 5 and 6, each gully has at least one and preferably a pair of external stiffening ribs 39 extending longitudinally along its bottom. As previously described, the spacer bars 13 are H-shaped in cross section, so that the side flanges 15 and 16 of each bar also extend above the horizontal web 17 to form a pair of upright ribs 40 and 41.

To assure that the ends of the gullies are maintained in exact longitudinal alignment, a slot or notch 42 is cut transversely through the bottom edges of both stiffening ribs of each gully, in line with the upright ribs 40 of the spacer bars on one rail. To assure that the gullies are maintained at the predetermined lateral spacing (corresponding to the spacing between feed tubes), pairs of adjacent slots or notches 43 and 44 are cut into the top edges of the other upright ribs 41 of the spacer bars on the one rail referred to above and into the top edges of both upright ribs 40 and 41 of the spacer bars on the other rails, all at the predetermined intervals. The distance between the two notches in each pair of notches 43 and 44 is equal to the spacing of each pair of the gully stiffening ribs 39.

As shown most clearly in the exploded detail perspective view of FIG. 5, the stiffening ribs 39 of each gully are engaged by corresponding notches 43 and 44 in upright rib 41 of the one spacer bar, while the adjacent upright rib 40 of such spacer bar is engaged by the slots 42 in the two stiffening ribs of the gully. At the points of intersection of the stiffening ribs 39 of the gully with the remaining spacer bars, such stiffening ribs are engaged by notches 43 and 44 in both upright ribs 40 and 41 of such spacer bars. Thus, each gully can be quickly and easily locked in place on the spacer bars by aligning each slot 42 with the respective rib 40 of the one spacer bar and then aligning the stiffening ribs 39 with the respective pairs of notches 43 and 44 in rib 41 of such spacer bar and in ribs 40 and 41 of the remaining spacer bars. The gully then drops down so that the stiffening ribs of the gully interlock with the vertical flanges of the spacer bars.

As shown in FIG. 4, each gully has only one slot 42 througn its stiffening ribs. Although identical slots at each intersection of the stiffening ribs with a spacer bar would provide maximum interlocking effect against axial movement of the gullies, use of more than one slot 42 per gully would cause jamming of the gullies between the rails unless the lateral spacing of the rails were perfectly uniform and the gullies always lay exactly at right angles to the rails. Use of a single slot does, of course, require spacer bars with two notch configurations. A compensating advantage is that it is quicker to cut a slot through both ribs, since a large number of spacer bars can be set up side by side and a single saw cut made through all of them, whereas notches in a single rib of a pair must be cut individually.

It should be noted that although the spacer bars of the preferred embodiment have two upright ribs, interlocking can also be obtained with only one rib. In that case, a notch would be cut in one of the stiffening ribs of a gully to engage the single rib of the spacer bar, and a notch would be cut in the upright rib of the spacer bar to engage the other stiffening rib of the gully.

EXAMPLE

The apparatus and method of using it will now be illustrated by a specific example of a two-stage hydroponic system for growing lettuce. The first stage of the system is a nurseling stage lasting about one week; the second is the maturing stage and lasts about three to four weeks. The apparatus used in each stage is essentially the same, the principal difference being the spacing of the plants and the total length of the support rails. It may also be desirable to have the first stage enclosed in an artificially illuminated growth room and the second stage in a more conventional greenhouse.

In each stage the rails are made up from angle bars with wheels bolted to each bar at intervals of 6 inches (152 mm). The bars and wheels are standard items obtainable from wheel conveyor suppliers. Although ball bearing wheels are available, it has been found that inexpensive molded plastic wheels mounted on simple flanged tubular bushings have low rolling friction, are less susceptible to corrosion and are perfectly suitable.

In each stage the rails are set up in four parallel lines 4 feet (122 cm) apart. Each line of rails in the nurseling stage is 33 feet (1005 cm) long; each line in the maturing stage is 110 feet (3353 cm) long. Of course, any length of growing "field" for each stage can be chosen, depending on the relative growing time per stage and the desired production rate. The rails may be set up level along their length although since the collection gutters 35 and 36 must be pitched in order to drain properly, pitching the rails correspondingly permits the gutters to be placed up close to the ends of the gullies and minimizes splashing. A slight downward pitch from entrance end to exit end may be desirable in some installations to reduce the force necessary to move the gullies along the rails. It has been found, however, that one person stationed at the entrance end of a level, filled maturing stage 110 feet in length can push the entire interlocked structure of gullies and spacer bars toward the exit end.

As mentioned previously, the spacer bars are H-shaped in cross-section; they are preferably extrusions of polyvinyl chloride or other plastic material. The spacing between the inner faces of the vertical flanges at the web of the H should be slightly greater than the width of the wheel rims, and the spacing between these faces at the edges of the flanges should be greater still, to prevent binding of the spacer bars on the wheels. The overall height of the flanges is not a critical dimension; in the exemplary embodiment it is 0.859 inch (21.8 mm).

As mentioned previously, the gullies are standard items made of extruded polyvinyl chloride having two stiffening ribs 39 extending below the bottom and two inturned flanges or lips 45 (FIGS. 5 and 6) at the top. Each gully is 16 feet (488 cm) long, and the slots for engagement with the upright ribs of the corresponding spacer bars are cut so that there will be a 2-foot (61 cm) overhang beyond the outside rails of either stage.

The spacer bar length and the spacing of the gullies on the bars are different for the two stages, as mentioned above. In the nurseling stage the spacing between gullies is 2¾ inches (70 mm), and the spacer bars are 19¼ inches (49 cm) long, which provides for seven gullies per spacer bar. In the maturing stage the spacing between gullies is 6 inches (152 mm), and the spacer bars are 24 inches (61 cm) long, providing for four gullies per spacer bar. In each case the spacer bars could be longer, if desired, but it has been found that the above lengths are most practical from a handling standpoint. In any event, spacer bar length should be an integral multiple of the distance between gullies, with the pair of notches closest to each end of the spacer bar centered one half of such distance from the end.

The procedure for introducing plants into, transporting them through, and harvesting them from the system is as follows. At the entrance end of the nurseling stage, four of the 19¼ inch (49 cm) spacer bars are laid on the respective four rails with the notched edges of the side flanges facing up. A guard board or bumper 47 (see FIG. 1) mounted, for example, by angle brackets 48 is provided across the entrance and exit ends of the rails to protect the workers from sharp rail ends and to prevent the spacer bars and gullies from rolling off the rails. The guard board serves the important additional function of a stop member such that all of the troughs are automatically located under respective outlets of feed tubes 32 when the spacer bar at the end of each rail abuts the guard board. If desired, a stop member or members separate from the guard boards can be provided.

Seven gullies are next fitted onto the spacer bars so that the respective stiffening bottom ribs and upright ribs interlock, as previously described. As interlocked, the inlet end of each gully is positioned under a respective feed tube 32 (the feed tubes of the nurseling stage of course being spaced at the same spacing as the gullies). To provide additional margin for positioning variations, the in-turned flanges 45, 46 at the top of each gully can be cut away at the inlet end to provide a larger opening 50 for the stream from the feed tube, as shown in FIG. 5.

Preferably, the inlet ends of the gullies are capped, and the outlet ends are open so that all liquid nutrient entering each gully is discharged only at the outlet end. The heights of the rails are set so that the gullies have a slight downward pitch from inlet to outlet. Selection of the pitch and also of nutrient composition and flow rate are dependent on factors known to those of skill in the art and do not constitute part of the present invention.

Next, seedlings 49 are placed in each gully at approximately three-inch (76 mm) spacing. Typically, the lettuce will be started from seed, individual seeds being placed in individual blocks 51 of a conventional plastic foam material. When the seedlings reach the desired size for transfer to the nurseling stage, individual plants in their respective blocks are detached from a sheet of the blocks and placed in the gullies. Each block should be large enough to provide a stable base for the growing plant yet small enough to fit easily between the lips of a gully.

Additional sets of spacer bars and gullies are added at periodic intervals, depending on the growth rate of the plants, harvesting requirements and work schedule until the nurseling stage is filled with gullies containing plants at progressively advanced growth stages. After this point, a set of gullies and spacers must be removed from the exit end of the stage before the entire array can be pushed forward on the rails and a new set can be added to the entrance end.

The gullies removed from the nurseling stage are transferred, with their plants intact, to the entrance end of the maturing stage, while the associated spacer bars are returned for use at the entrance end of the nurseling stage. At the entrance end of the maturing stage a new set of four of the previously described longer spacer bars, having notches for four gullies each, are laid on the four rails. These spacer bars essentially double the spacing between gullies. Since it is desirable from the point of view of uniformity and symmetry of plant growth to provide approximately the same amount of open space on all sides of each plant, it is necessary also to double the spacing between the plants in each gully. This is accomplished quickly, and with minimum labor and damage to the plants, by the simple procedure of fitting an empty gully in the leading notches of the spacer bars and a filled gully from the nurseling stage in the next set of notches (or vice versa). Another empty gully is fitted into the third set of notches and a filled gully into the final set of notches of the first group of spacer bars. Thus, empty gullies alternate with filled gullies.

Next, every other plant in the second gully is picked up and moved directly forward into the first gully. The arrangement of plants at the end of this step is as shown in FIG. 2. Similarly, alternate plants from the fourth gully are moved to the third gully. The result is a staggered array of plants that are spaced the same along the axes of the gullies as they are in the direction of the rails. The doubled spacing is accomplished accurately yet rapidly, without the need for measurements or templates and by handling only half of the plants. Permanent marks placed on the lips of each gully at intervals equal to the desired spacing of plants within the gullies at the maturing stage are helpful in achieving rapid and uniform results.

Additional sets of spacer bars and alternate empty and filled gullies are introduced at the entrance end of the maturing stage to accommodate the number of plants transferred from the nurseling stage, and this procedure is repeated periodically in synchronism with the "planting" cycle. When the maturing stage is filled, the first group of plants has reached the exit end of the rails and is ready to be harvested. Following harvest, the spacer bars are returned for use at the entrance of the maturing stage, while the empty gullies are cleaned and returned to the entrance ends of both stages as required.

Because the plant spacing is approximately doubled both laterally and longitudinally, the maturing stage requires about four times the area of the nurseling stage for the same number of plants. It is advantageous, therefore, to provide multiple parallel groups of rails for the maturing stage plants to avoid excessively long individual stages, particularly since the time spent in the maturing stage in the example is more than twice as long as that spent in the nurseling stage.

Although the method of the invention has been described in connection with a single type of plant that moves completely through the system and is harvested at the exit end of the maturing stage, the relatively short length of the spacer bars provides great flexibility, since it allows the gullies to be pushed apart at any intermediate location in the maturing stage array for access to the plants. Thus, plants having shorter maturation times can if necessary be interspersed with other varieties having longer maturation times and can be harvested from intermediate points in the array simply by pushing the gullies apart, entering the array, and picking up an entire gullies filled with the mature plants. In this connection, the advantage of providing a gutter under the feed tubes is further apparent, since this allows removal of a gully without shutting off the nutrient flow and without the need to replace the gully.

The foregoing example has illustrated the apparatus and method of the invention without intent to limit it to the specific aspects described. For example, more than two stages could be used for some varieties of plants, with different spacing for each stage. Two stages, however, appear to be the most economical compromise between minimizing space requirements and minimizing the labor required to transfer the plants from one stage to the next. Also it has been found that the extra space provided around each plant at the entrance end of the maturing stage (and for a portion of its travel through the stage) results in more rapid growth than when the plants are maintained close to one another. Since growth time has a direct effect on cost of production, this faster growth will at least partially offset the loss of packing density when the area per plant is quadrupled from the nurseling stage to the maturing stage.

The example illustrates clearly, moreover, that the apparatus of the invention is simple, easily maintained, reusable, and can be operated and used by unskilled workers.

What is claimed is:

1. Apparatus for supporting, positioning and transporting plants in a hydroponic growing system, the apparatus including a plurality of elongated troughs, each trough having an inlet end, an opposite outlet end, a bottom portion, and at least one longitudinally extending external rib depending from said bottom portion; means for supporting said troughs in spaced parallel relation so that the inlet end of each trough is at a first level and the outlet end is at a second level lower than the first level; means for delivering a flow of liquid nutrient to the inlet end of each trough; and means for collecting a flow of liquid nutrient from the outlet end of each trough, wherein the improvement comprises said means for supporting, positioning and transporting said troughs in spaced parallel relation including:
   at least two spaced apart rails extending under the troughs transversely to the longitudinal axes thereof;
   a multiplicity of wheels rotatably mounted on each rail, the axes of rotation of the wheels perpendicularly intersecting at spaced intervals a longitudinal axis of the rail such that part of the rim of each wheel extends above the top of the rail; and
   at least two elongated spacer bars disposed end-to-end on each rail, each spacer bar having a longitudinal bottom groove engaged by the rims of a plurality of the wheels, such that the bar makes rolling contact with the wheels and is guided thereby along the rail, and at least one upright rib extending longitudinally along the top of the bar, said rib having at least one notch in the upper edge thereof for transversely receiving the bottom rib of a respective trough, whereby the spacer bars maintain the troughs in spaced relation.

2. Apparatus according to claim 1 wherein each of the at least two spacer bars on one of the rails comprises a second upright rib extending in spaced parallel relation to the first upright rib thereof, and the at least one external rib depending from the bottom of each trough has a notch in the lower edge thereof for transversely receiving said second upright rib, thereby maintaining the troughs in fixed transverse relation on the rail.

3. Apparatus according to claim 1 or 2 wherein each spacer bar has an H-shaped cross section, the lower portion of the H forming said bottom groove and the upper portion of the H forming first and second upright ribs.

4. Apparatus according to claim 1 wherein the at least two spacer bars on each rail comprise a multiplicity of spacer bars of equal length, such length being an integral multiple of the distance between troughs but each spacer bar being no more than 1 meter long, to permit convenient loading and unloading of spacer bars and troughs onto and from the rails.

5. Apparatus according to claim 1 wherein the bottom groove of each spacer bar has a flat horizontal surface at least as wide as the rims of said wheels and side surfaces that flare outwardly to the opening of the groove to assure that the spacer bars are guided freely on the wheels without binding.

6. Apparatus according to claim 1 wherein the means for delivering a flow of liquid nutrient to the inlet end of each trough comprises
   a header pipe extending adjacent to the inlet ends of said troughs;
   a shelf extending under and supporting the header pipe;
   a plurality of feed tubes connected to the header pipe at spaced intervals equal to the spacing of the troughs, each feed tube having an open end directed downwardly through a corresponding hole in the shelf on which the header pipe is supported for delivering liquid nutrient from the header pipe into a corresponding trough; and
   a stop member disposed at an end of at least one of the rails such that each trough is positioned under a corresponding feed tube where one of the spacer bars abuts the stop member.

7. Apparatus according to claim 1 wherein the means for collecting liquid nutrient from the outlet end of each trough comprises a gutter extending under the outlet ends of said troughs and a member having a convexly curved upper surface placed in the gutter for preventing splash.

* * * * *